United States Patent
Leavy et al.

(10) Patent No.: US 7,500,264 B1
(45) Date of Patent: Mar. 3, 2009

(54) USE OF PACKET HASHES TO PREVENT TCP RETRANSMIT OVERWRITE ATTACKS

(75) Inventors: Nicholas Leavy, Palo Alto, CA (US);
Michael L. Hall, Jr., Austin, TX (US);
Timothy Hahn, Sunnyvale, CA (US);
Mohit Jaggi, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 804 days.

(21) Appl. No.: 10/820,327

(22) Filed: Apr. 8, 2004

(51) Int. Cl.
*G06F 7/04* (2006.01)
*G06F 7/58* (2006.01)
*G06F 15/16* (2006.01)
*G06F 17/30* (2006.01)

(52) U.S. Cl. .............. 726/13; 726/2; 726/22; 726/26

(58) Field of Classification Search .......... 726/2, 726/26, 22
See application file for complete search history.

(56) References Cited

U.S. PATENT DOCUMENTS

| | | | | |
|---|---|---|---|---|
| 5,832,210 | A * | 11/1998 | Akiyama et al. | 713/168 |
| 2004/0093505 | A1 * | 5/2004 | Hatakeyama et al. | 713/189 |
| 2006/0077908 | A1 * | 4/2006 | Park et al. | 370/254 |
| 2006/0136715 | A1 * | 6/2006 | Han et al. | 713/151 |
| 2006/0253906 | A1 * | 11/2006 | Rubin et al. | 726/23 |

OTHER PUBLICATIONS

Thomas H. Ptacek and Timothy Newsham; *Insertion, Evasion, and Denial of Service: Eluding Network Intrusion Detection*; Jan. 1998; available at http://www.acri.org/vern/Ptacek-Newsham-Evasion-98.ps; last visited Mar. 19, 2003; 55 pages.

Vern Paxson; *Bro: A System for Detecting Network Intruders in Real Time;* Computer Networks, Dec. 1999; 31 (23-24) pp. 2435-2463; also available at http://www.icir.org/vern/bro-info.html.

Mark Handley, Vern Paxson and Christian Kreibich; *Network Intrusion Detection: Evasion, Traffic Normalization, and End-to-End Protocol Semantics;* Proceedings of USENIX Security Symposium 2001, available at Http://www.icir.org/vern/papers/-norm-usenix-sec-01.html/index.html; last visited Mar. 19, 2003; 17 pages.

* cited by examiner

*Primary Examiner*—Brandon S Hoffman
*Assistant Examiner*—Chinwendu C Okoronkwo
(74) *Attorney, Agent, or Firm*—BainwoodHuang (57) ABSTRACT

Embodiments of the invention are directed to systems that detect maliciously formed TCP/IP retransmit packets attempting to pass through an intrusion detection system (IDS) and prevent them from reaching their destination by forcing early flow termination. The IDS may be configured to track a hash of certain fields in each packet. This set of hashes is maintained for all of the packets in the currently open TCP window for each flow. If the hash of a retransmit packet does not match the cached hash of the corresponding original packet, the system concludes that there is an attack under way and terminates the flow. The hash function may range in complexity and security from low complexity and relative insecurity to high complexity and high security. Hash algorithms may also be used in conjunction with a private seed value concatenated with the packet fields prior to hashing.

35 Claims, 5 Drawing Sheets

USE OF PACKET HASHES TO PREVENT TCP RETRANSMIT OVERWRITE ATTACKS

CROSS-REFERENCE TO RELATED APPLICATIONS

The present application is related to the co-pending application entitled "USE OF PER-FLOW MONOTONICALLY DECREASING TTLs TO PREVENT IDS CIRCUMVENTION," application Ser. No. 10/820,591, filed on even date herewith, the disclosure of which is hereby incorporated herein by reference in its entirety.

BACKGROUND

A typical computer networking system may include, among other things, an intrusion detection system (IDS) configured to monitor network traffic and to block attempted attacks on or intrusions into the protected network space. Such intrusion detection systems may coexist with various types of firewalls, packet monitors, and other devices and typically include intrusion sensing functions (e.g., advanced routers). These systems include both active and passive devices and may be generally referred to as "sensors." Passive network sensors, for example, may utilize "promiscuous mode" access: a promiscuous network monitoring device, commonly referred to as a sniffer, examines copies of all of the packets directly from the network media, regardless of packet destination. Active sensors may read the packet off the network, store it until it is processed, and write it back to the network, possibly with modification.

One way to circumvent a conventional IDS is to use the time to live (TTL) field of the conventional Internet Protocol (IP) packet to confuse (or "de-synchronize") the sensor. This is a desirable goal for the attacker because a de-synchronized IDS typically "fails open," i.e., it stops applying its policy and filtering rules and allows all traffic to pass through. Ill-intentioned people have been known to send a TCP/IP packet with a TTL set low enough (e.g., TTL=1) so that the packet reaches the sensor but does not make it to the destination host. Since this packet is only seen by the sensor and not the end host, its only purpose is to confuse the IDS with a data stream that the end host will never process. On retransmission, however, the attacker sends a packet with a higher TTL (such as TTL=50 or 55), but now containing malicious data in the payload field. "Malicious data" includes a virus or other software code designed to subvert or disable the target host. The "retransmitted" TCP packet passes through the IDS sensor because the sensor assumes that any packet received with a previously seen TCP sequence number is a retransmit packet and does not try to re-analyze the data payload. Re-analysis of retransmit packets is generally considered too difficult because IDS sensors do not store the state they were in when the packet was first received: that kind of packet inspection is very costly in terms of processor resources and throughput/latency impacts. Typically, packet state is only maintained for the original packet, and even that state is limited to a small window (e.g., 256 bytes) of the most recent data received from each flow.

The malicious packet will thus be sent on unimpeded to the destination host in accordance with conventional IP routing protocols. Furthermore, there are other ways of de-synchronizing an IDS that allow a maliciously-formed retransmit packet to bypass IDS protection. These types of attacks are sometimes called "overwrite" attacks because the attacker is attempting to insert code by overwriting the data payload in a retransmit packet. The end host will accept the bad packet because the original packet (the packet that timed out) will not have been seen and acknowledged by the end host. Once the bad payload arrives at the end host, it may then initiate or trigger an attack on the end host or on other hosts in the network.

By design, the only difference between the original packet and its corresponding retransmit packet are the "mutable" fields within the IP packet header, such the TTL field, and the mutable fields within the TCP header, such as the Flags and Acknowledgement Number fields. The TCP packet (encapsulated within the IP data payload field) is supposed to be unchanged from the original TCP/IP transmission.

Intrusion detection systems and the various types of insertion, evasion, and overwrite attacks are generally described in (for example) T. H. Ptacek and T. N. Newsham, *Insertion, Evasion, and Denial Of Service: Eluding Network Intrusion Detection*, Secure Networks, Inc. (January 1998), http://www.acri.org/vern/Ptacek-Newsham-Evasion-98.ps (visited on Mar. 19, 2003); V. Paxson, *Bro: A System for Detecting Network Intruders in Real-Time*, Computer Networks, 31 (23-24) pp. 2435-2463 (December 1999); and M. Handley, V. Paxson, and C. Kreibich, *Network Intrusion Detection: Evasion, Traffic Normalization, and End-To-End Protocol Semantics*, Proc. USENIX Security Symposium 2001, http://www.icir.org/vern/papers/-norm-usenix-sec-01-html/index.html (visited on Mar. 19, 2003), incorporated herein by reference in their entireties.

SUMMARY

What is needed is a method of screening packets in an intrusion detection system that detects when a packet retransmitted due to a deliberately-forced time to live (TTL) failure (or other de-synchronization of IDS function) differs from the original packet and thus avoids attacks based on the IDS's inability to validate retransmit packets against original packet state.

Embodiments of the invention are therefore directed to systems that detect maliciously formed retransmit packets (which were retransmitted due to a TTL failure) attempting to pass through the IDS. The system then prevents the malicious retransmit packets from reaching their destination. In one embodiment, an IDS sensor is configured to keep track of a hash of certain, non-mutable fields in each TCP packet, i.e., on the header fields that are the same in both the original and retransmit packets. This hash does not include well-known mutable TCP header fields, such as Flags or Acknowledgement Number. This set of hashes is maintained for all of the packets in a currently open TCP window for each flow. If the hash of a retransmit packet does not match the previously stored hash of the corresponding original packet, the system concludes that there is an attack (or other protocol violation) under way and terminates that flow.

Accordingly, a maliciously formed retransmit packet will cause its flow to be terminated, preventing bad data or attack packets from reaching the destination host. This result follows from the fact that the hash function is constructed so that the probability that the hash of the maliciously-formed retransmit packet precisely matches that of the original packet is vanishingly small.

In some embodiments, the hash function ranges in complexity and security from low complexity and relative insecurity to high complexity and high security. Hash functions that are suitable for use include checksums derived from linear feedback shift registers, strong hash algorithms, and cryptographically secure hashes such as the MD5 and SHA algorithms. Hash algorithms may also be used in conjunction with a private seed value: the private seed may be attached to (or concatenated with) the selected non-mutable packet fields prior to computing the hash value. Additionally, the amount of time that the validation signature (the hash of the original packet) is maintained in memory may be varied to provide greater protection from delayed retransmits.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention are directed to techniques and systems for blocking the transmission of maliciously formed packets by generating signatures using a hash algorithm and, upon receipt of a retransmit packet, comparing a newly-generated hash (referred to herein as a "test signature") with the hash of the original packet (referred to herein as the "validation signature"). Malicious packets that attempt to penetrate a protected network by subverting or confusing the time to live (TTL) mechanism employed in TCP/IP packet networking will fail this test because the attacker will be unable to embed an attack within the retransmit packet that will hash to the same signature as the original packet. In the general case, any maliciously-formed retransmit packet sent by an attacker after deliberate de-synchronization of IDS functions will also be detected. The network is protected because only a retransmit packet that matches its corresponding, previously-screen original packet (and is therefore assured safe) will be allowed past the IDS. Moreover, if a flow attempts to exploit this particular retransmit vulnerability even once (i.e., with a single retransmit packet whose hash fails to match), the entire flow will be flagged as being in violation of protocol and will be terminated.

Figure 1A:
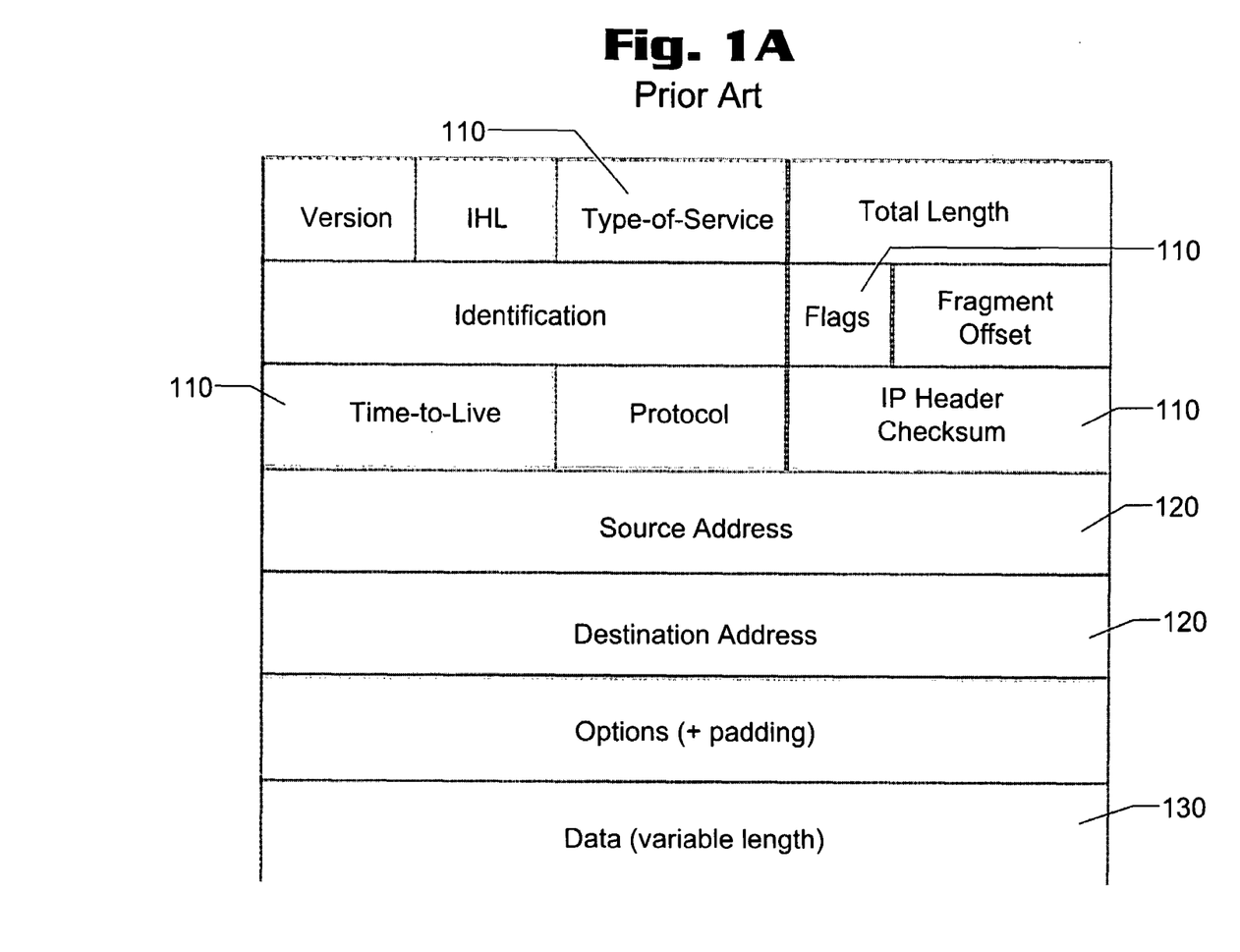
FIG. 1A is a high-level schematic representation of the prior art IP version 4 packet format.

FIG. 1A is a schematic representation of the well-known Internet Protocol version 4 (IPv4) packet format, illustrating the presence and location of the TTL field and other mutable and non-mutable fields. The mutable fields 110 consist of most of the IP header fields, for example TTL, TOS (also known as Differentiated Services Codepoint or DSCP), and Flags. The non-mutable fields 120 consist of at least the flow identifying fields (SA, DA, etc.) and the data payload 130.

Although the invention is described by reference to the IPv4 packet format, those skilled in the art will realize that IP version 6 (IPv6) packets may also employ the inventive techniques and systems. In the IPv6 format, as in IPv4, the flow identifying fields and the data fields may still be used as all or part of the non-mutable fields for hash calculation purposes. Furthermore, malicious reformation of some IP options in the IPv6 packet header can also cause IDS de-synchronization. Accordingly, the invention is not limited to any particular packet format or cause of IDS de-synchronization.

Figure 1B:
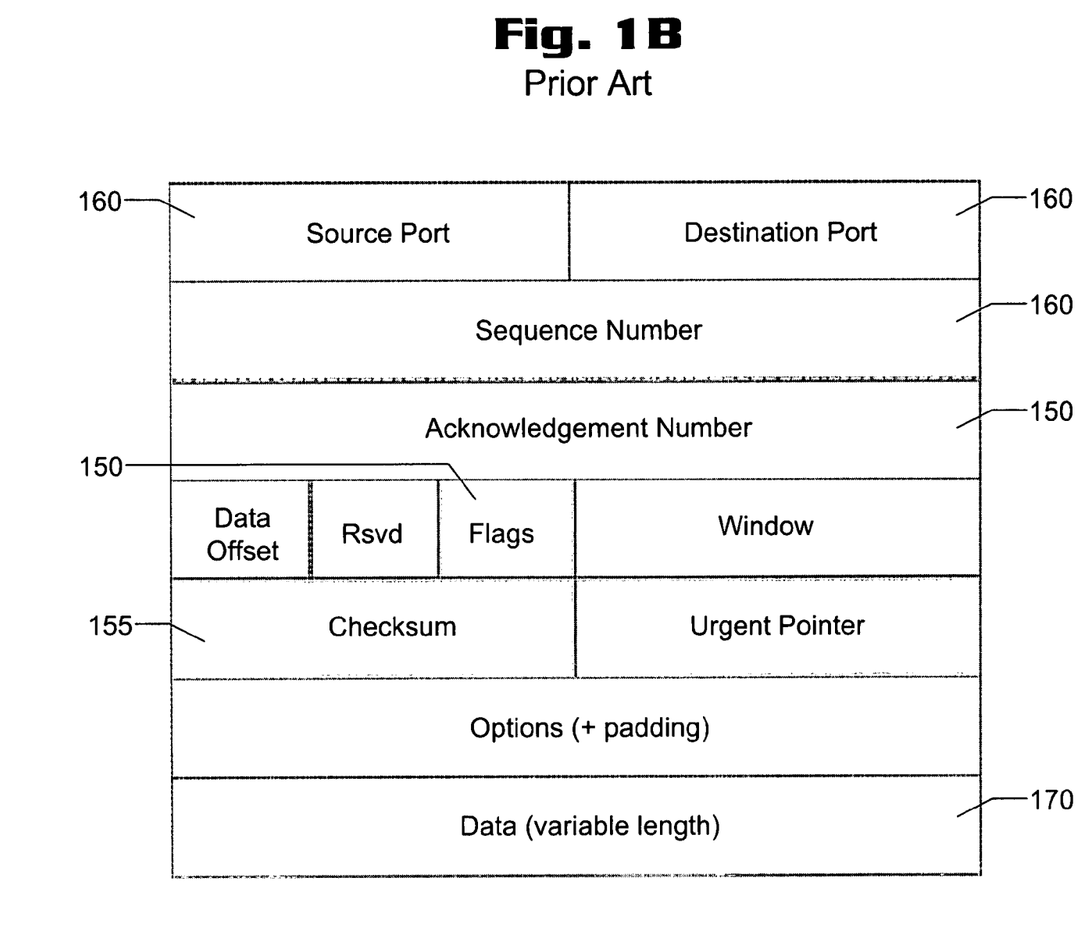
FIG. 1B is a high-level schematic representation of the prior art TCP packet format.

FIG. 1B is a schematic representation of the well-known Transmission Control Protocol (TCP) packet format, illustrating the presence and location of the Sequence Number field and other mutable and non-mutable fields. The mutable fields 150 consist of most of the TCP header fields, for example Acknowledgement Number and Flags, and the TCP Header Checksum 155. The non-mutable fields 160 consist of at least the flow identifying fields (Source Port, Destination Port), the Sequence Number, and the data payload 170.

Figure 2:
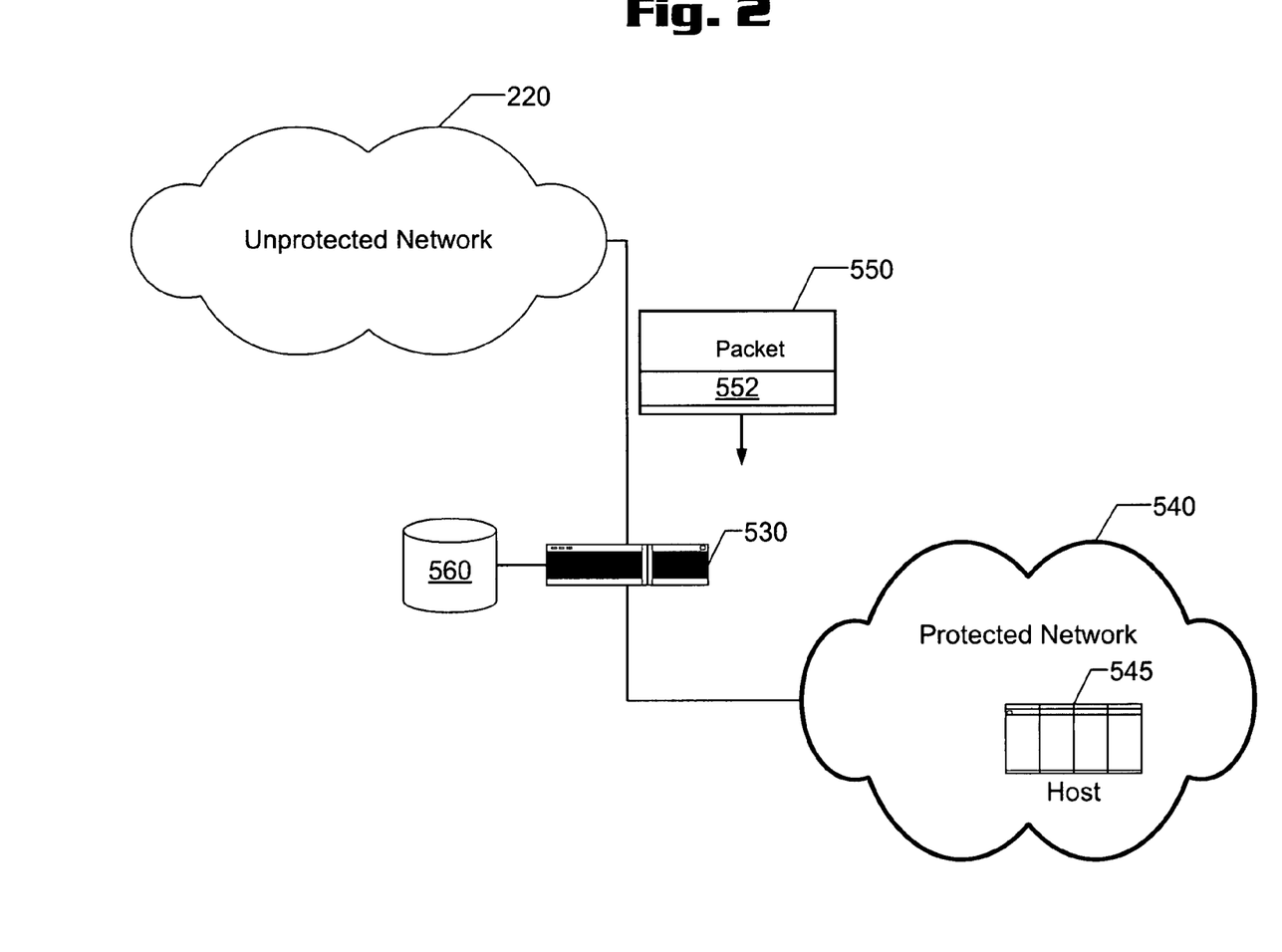
FIG. 2 is a high-level block diagram of an intrusion detection system (IDS) sensor in a network configured according to one embodiment of the present invention.

FIG. 2 depicts at a high-level an unprotected network 220, IDS sensor 530, and destination (protected) network 540 including destination host 545. Protected network 240 may be, for example, a private LAN or MAN or a campus-wide network serving a large company or university. The IDS sensor functionality is configured to test packets 550 by looking at a hash value computed for each TCP packet 550 in a flow. In particular, IDS sensor 530 blocks passage of malicious data payloads 552 by hashing the non-mutable fields (as described above with reference to FIGS. 1A and 1B) of each TCP packet 550 and storing those hashes, in some embodiments, indexed by flow and packet sequence number, in flow cache 560.

Although IDS sensor 530 is described as a physical device located in-line (in the packet stream) on a network, those skilled in the art will realize that the presently-described IDS sensor functionality may be implemented in hardware and/or software located in any device on a network. Furthermore, IDS functions may be provided other devices and/or device functionality such as firewalls, load balancers, advanced routers (which implement firewall and intrusion detection functions within their software), and the like. Accordingly, although the term "IDS sensor" is used throughout this Specification, the present invention should be understood to apply to any implementation of the inventive intrusion detection function in a network, whether in hardware or software or in a stand-alone or integrated device.

Figure 3:
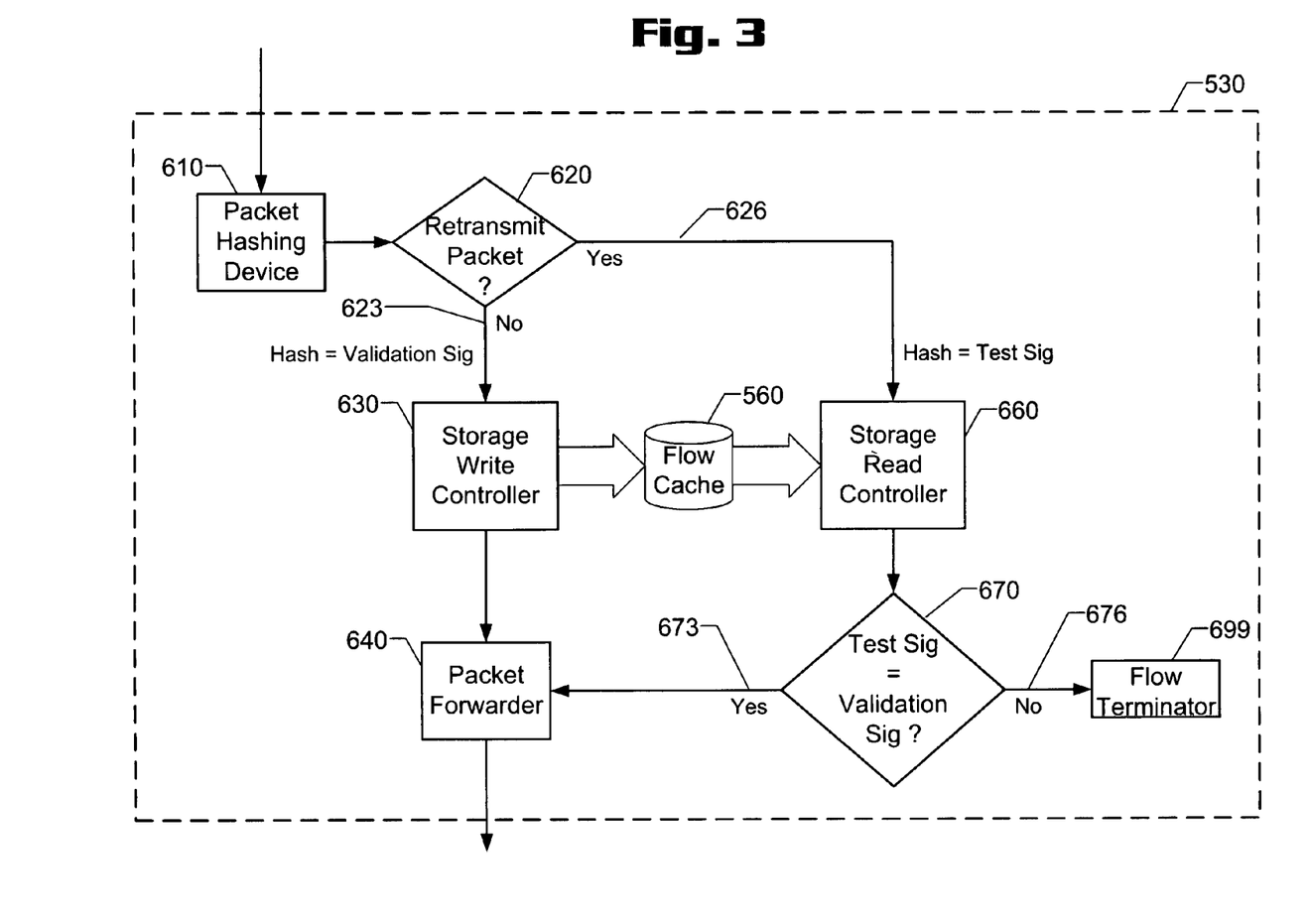
FIG. 3 is a high-level block diagram of IDS functionality, according to one embodiment of the present invention.

FIG. 3 illustrates a high-level block diagram of the interior processing of IDS sensor 530 in accordance with FIG. 2 above. Sensor 530 computes and compares hash values for each original packet and retransmit packet in a particular flow, terminating any flow in which the hash of the retransmit packet fails to match the hash of the original packet.

In some embodiments, IDS sensor 530 consists of a packet hashing device 610, flow cache 560 (see also FIG. 2), packet forwarder 640, flow terminator 699, and associated control and decision logic 620, 670. Packet hashing device 610 reads certain pre-determined, non-mutable fields from each TCP packet and computes a hash value unique to each packet. If the packet is not a retransmit packet, as determined by decision logic 620, processing follows branch 623 and the hash value (now referred to as the "validation signature") is stored by storage write controller 630 in flow cache 560. The validation signature may be indexed by flow identifier and packet sequence number or by a subset or superset of available, TCP-packet-specific identifiers generally known in the art. The packet is then sent for transmission out of IDS sensor 530 by packet forwarder 640 (e.g., for receipt by host 545, as described above with reference to FIG. 2).

If the packet is found to be a retransmit packet by decision logic 620, processing follows branch 626 instead. At this point, the hash value is now referred to as the "test signature," i.e., the packet hash that the system must test for validity. Storage read controller 660 then fetches the validation signature for the particular original packet of interest using, for example and not by way of limitation, the packet's TCP sequence number and flow ID. Discriminator 670 then compares the test signature to the validation signature. If the two signatures are identical, then the retransmit packet is valid and it can be sent on by packet forwarder 640. If not (branch 676), then the retransmit packet does not match the original packet and should considered malicious (or at least bogus). Accordingly, the flow is terminated by flow terminator 699.

After each packet is acknowledged by the destination host (via the conventional TCP/IP acknowledgement mechanism, either with or without TCP windowing), the packet sequence number, validation signature, and any packet information may be flushed from flow cache 560 by conventional means.

Figure 4:
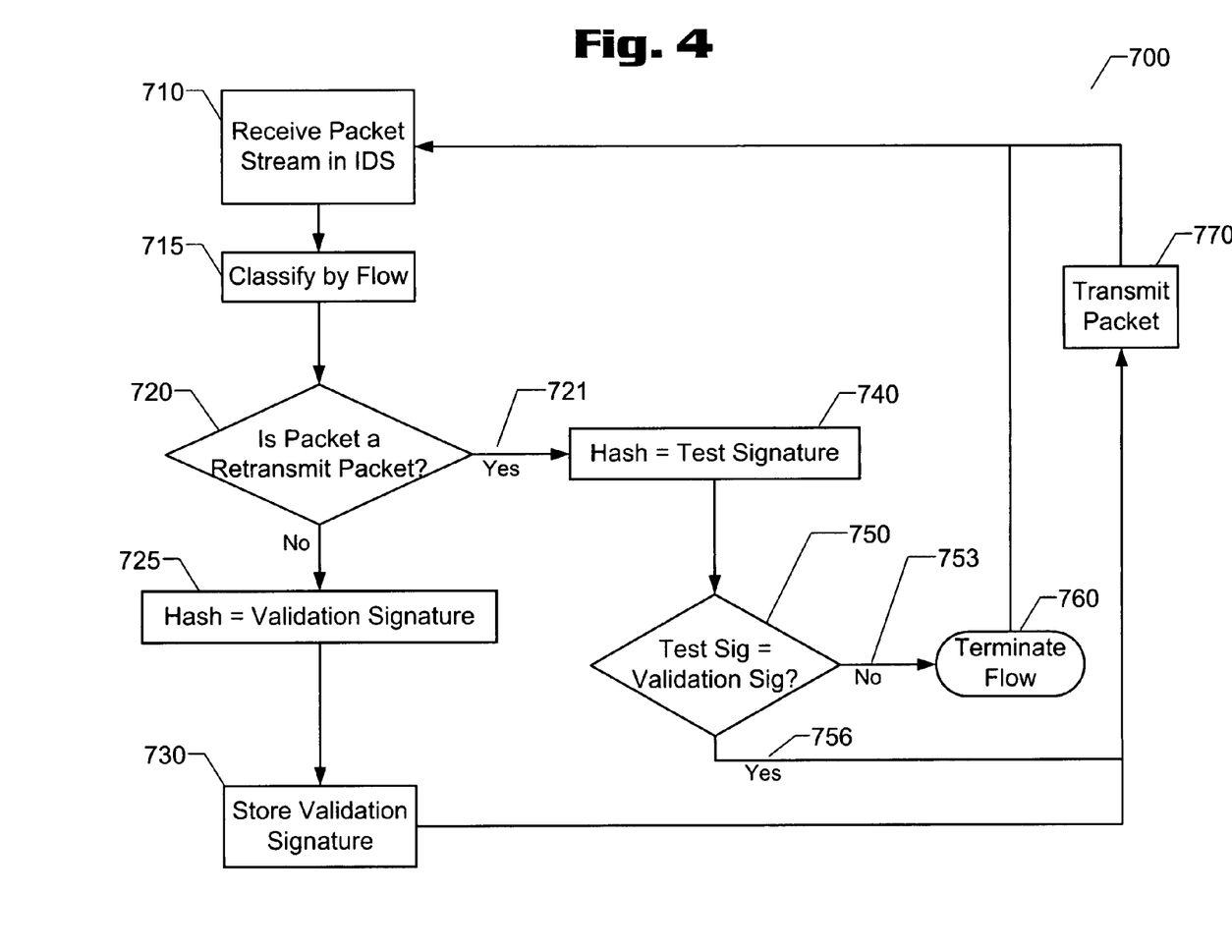
FIG. 4 is a flowchart of the IDS processing employed by the sensor of FIG. 3, according to one embodiment of the present invention.

FIG. 4 illustrates a high-level flowchart depicting a process 700 whereby an embodiment of the IDS sensor depicted in FIG. 3 evaluates retransmit packets. A packet stream consisting of original packets and corresponding retransmit packets arrives at the sensor in step 710. Each original packet and its corresponding retransmit packet belongs to a packet flow and is classified accordingly in step 715.

For each original packet (as determined in discrimination step 720), embodiments of the invention hash the non-mutable TCP fields, 725, to form a validation signature. The validation signatures for each packet are then stored, 730, in a flow cache indexed by (at a minimum) the packet sequence number. Original packets are the transmitted out of the IDS sensor, step 770.

As each retransmit packet is received (following now branch 721), selected non-mutable TCP fields are hashed in step 740 (using the same algorithm used in step 725) to produce a test signature. The test signature is then compared in step 750 to the validation signature for the packet having the same sequence number (i.e., the corresponding original packet). If the test signature and the validation signature are not identical, denoted by branch 753, then it follows that the retransmit packet does not contain the same TCP data payload as the original packet, i.e., the retransmit packet could be a maliciously formed attack packet. In such case, the system terminates the packet flow by conventional means well-known in the art, step 760, and no further packets from that flow are transmitted from the IDS. Process 700 then loops to step 710 to process the next packet.

If the signatures match (denoted by branch 756), the packet is ready for transmission out of the IDS in step 770. Process 700 then loops back to step 710 to evaluate the next packet.

Although a serial sequence is illustrated for clarity, one of ordinary skill in the art will readily appreciate that a pipelined or parallel operation is also possible (and in fact desirable) since the packets arrive rapidly and in a continuous stream. Accordingly, the present invention is not limited to a serial sequence of steps.

In particular, one type of hash that may be used is the TCP header checksum value 155 (referring back to FIG. 1B), which is computed for every TCP packet. This is a very efficient hash value to use as a validation signature, because it is stored in the original TCP packet header. The test signature can be rapidly computed by simply examining the retransmit packet's data payload and adjusting for any changes in the retransmit packet header.

A more secure (or "stronger") hash is a polynomial hash, examples of which are described in the *Intel 2400/2800 Programmer's Reference Manual*, Intel Corporation, incorporated herein by reference in its entirety. A strong hash makes it more difficult for an attacker to craft a malicious retransmit packet whose hash matches the original, but is somewhat more difficult to compute.

Stronger hashes, such as those known in the art as "cryptographically secure," provide even more robust protection from attackers and are therefore more desirable. Cryptographically secure hashes include the MD5 and SHA algorithms; these one-way hash algorithms and other cryptographically secure hashes are described, for example, in Bruce W. Schneier, *Applied Cryptography*, 2d ed. (1996), incorporated herein by reference in its entirety. Cryptographically secure hashes are defined generally as those hashes whose results are computationally impossible to replicate.

Alternatively, one can also use a polynomial hash of the packet prepended with a periodically changing secret key. Such a secret key or seed can be implemented with a pseudorandom number generator, for example that described in Section 5.2.4 of the *Intel 2400/2800 Programmer's Reference Manual* cited above. In an embodiment employing a hash-calculating coprocessor (or parallel processing to compute the hash value, two conventional implementations of hashing well within the knowledge of one of ordinary skill in the art), the step of prepending the secret key to a locally generated polynomial hash may be accomplished rapidly and with no additional latency.

In a further alternate embodiment, the system may instead employ a computationally cheaper hash. For example, a pseudorandom pattern derived from the data payload using a linear feedback shift register (LFSR) may be used as a checksum-like hash value. The LFSR checksum may be calculated by using a shift, add, and conditional XOR on a per-word basis, employing an initial condition that depends on an aspect of the internal state of the implementing device. For example, but not by way of limitation, the initial condition used in the LFSR checksum calculation may incorporate the index of the flow classification bucket, the MAC address of the IDS-implementing device, and/or some other internal state indicator unique to the flow or to the IDS device or functionality. Linear feedback shift registers and their uses are generally described at http://www.newwaveinstruments.com/resources/articles/-m_sequence_linear_feedback_shift_register_lfsr.htm (visited on Mar. 15, 2004), incorporated herein by reference in its entirety.

In a further alternate embodiment, the hash (whether weak, strong, cryptographically secure, computed using an LFSR or by any other technique without limitation) operates on a secret number or code sequence in addition to pre-determined, non-mutable packet field values. For example, but not by way of limitation, the hash may be performed on selected non-mutable fields concatenated with a pre-selected secret code phrase or key. Pre-selection may be accomplished, for example and not by way of limitation, by IDS operator configuration or by automatic generation from a date or time code. An attacker would not know this secret code and thus, even if they knew the hash function, could not construct a retransmit packet that would hash to the proper value. The secret number may be provided as an input to packet hashing device 610 in FIG. 3 (not shown).

ALTERNATE EMBODIMENTS

The order in which the steps of the present method are performed is purely illustrative in nature. In fact, the steps can be performed in any order or in parallel, unless otherwise indicated by the present disclosure.

The method of the present invention may be performed in hardware, software, or any combination thereof, as those terms are currently known in the art. In particular, the present method may be carried out by software, firmware, or microcode operating on a computer or computers of any type.

Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

While this invention has been particularly shown and described with references to embodiments thereof, it will be understood by those skilled in the art that various changes in form and details may be made therein without departing from the spirit and scope of the invention as defined by the appended claims.

We claim:

1. In an intrusion detection system, a method of blocking attacks on a computer network, comprising:
    receiving, in circuitry of the intrusion detection system, original packets and corresponding retransmit packets from a network, wherein:
        each said original packet and corresponding retransmit packet belong to a flow; and
        each said original packet and corresponding retransmit packet has a plurality of non-mutable field values;
    hashing, in the circuitry of the intrusion detection system, said non-mutable field values of each said original packet to produce a validation signature of each said original packet;
    storing, in the circuitry of the intrusion detection system, said validation signatures;
    hashing, in the circuitry of the intrusion detection system, said non-mutable field values of each said corresponding retransmit packet to produce a test signature of each said corresponding retransmit packet;
    comparing, in the circuitry of the intrusion detection system, said validation signature to said test signature; and
    if said test signature and said validation signature are not identical, terminating said flow by operating a flow terminator circuit of the intrusion detection system.

2. The method of claim 1, wherein said storing comprises retaining said validation signatures for a limited time.

3. The method of claim 1, wherein said hashing comprises computing a checksum from said non-mutable field values.

4. The method of claim 1, wherein said hashing comprises computing a hash value from said non-mutable field values.

5. The method of claim 1, wherein said hashing comprises computing a strong hash value from said non-mutable field values.

6. The method of claim 1, wherein said hashing comprises computing a cryptographically secure hash value from said non-mutable field values.

7. The method of claim 1, wherein said hashing comprises computing a LFSR checksum value using an internal state indicator and said non-mutable field values.

8. The method of claim 1, wherein said hashing comprises computing a hash value using a secret number.

9. In an intrusion detection system, a method of blocking attacks on a computer network, comprising:
    generating, in circuitry of the intrusion detection system, a validation signature of an original packet by hashing a plurality of non-mutable field values of said original packet;
    generating, in the circuitry of the intrusion detection system, a test signature of a retransmit packet, by hashing a plurality of non-mutable field values of said retransmit packet, said retransmit packet being a retransmission of said original packet with a flow of packets; and
    comparing, in the circuitry of the intrusion detection system, said test signature to said validation signature to determine whether to terminate said flow of packets by operating a flow terminator circuit of the intrusion detection system.

10. An apparatus for blocking attacks on a computer network, comprising:
    means for receiving original packets and corresponding retransmit packets from a network, wherein:
        each said original packet and corresponding retransmit packet belong to a flow; and
        each said original packet and corresponding retransmit packet has a plurality of non-mutable field values;
    first means for hashing said non-mutable field values of each said original packet to produce a validation signature of each said original packet;
    means for storing said validation signatures;
    second means for hashing said non-mutable field values of each said corresponding retransmit packet to produce a test signature of each said corresponding retransmit packet, wherein said first means for hashing and said second means for hashing employ the same hashing algorithm;
    means for comparing said validation signature to said test signature; and
    means for terminating said flow if said test signature and said validation signature are not identical.

11. The apparatus of claim 10, wherein said means for storing comprises means for retaining said validation signatures for a limited time.

12. The apparatus of claim 10, wherein said first means for hashing and said second means for hashing each comprise means for computing a checksum from said non-mutable field values.

13. The apparatus of claim 10, wherein said first means for hashing and said second means for hashing each comprise means for computing a hash value from said non-mutable field values.

14. The apparatus of claim 10, wherein said first means for hashing and said second means for hashing each comprise means for computing a strong hash value from said non-mutable field values.

15. The apparatus of claim 10, wherein said first means for hashing and said second means for hashing each comprise means for computing a cryptographically secure hash value from said non-mutable field values.

16. The apparatus of claim 10, wherein said first means for hashing and said second means for hashing each comprise means for computing a LFSR checksum value using an internal state indicator and said non-mutable field values.

17. The apparatus of claim 10, wherein said first means for hashing and said second means for hashing each comprise means for computing a hash value using a secret number.

18. An apparatus for blocking attacks on a computer network, comprising:
    a packet hashing device configured to receive original packets and corresponding retransmit packets from a network, wherein:
        each said original packet and corresponding retransmit packet belong to a flow;
        each said original packet and corresponding retransmit packet has a plurality of non-mutable field values; and
        said packet hashing device employing a packet hashing algorithm to hash said non-mutable field values of each said original packet to produce a validation signature of each said original packet and to hash said non-mutable field values of each said corresponding retransmit packet to produce a test signature of each said corresponding retransmit packet;

a flow cache connected to said packet hashing device and configured to store said validation signatures;

a comparator operably connected to said flow cache configured to compare said validation signature to said test signature and having an output; and a flow terminator receiving said output of said comparator and configured to terminate said flow if said output indicates that said test signature and said validation signature are not identical.

19. The apparatus of claim 18, wherein said flow cache comprises means for retaining said validation signatures for a limited time.

20. The apparatus of claim 18, wherein said packet hashing device comprises means for computing a checksum from said non-mutable field values.

21. The apparatus of claim 18, wherein said packet hashing device comprises means for computing a hash value from said non-mutable field values.

22. The apparatus of claim 18, wherein said packet hashing device comprises means for computing a strong hash value from said non-mutable field values.

23. The apparatus of claim 18, wherein said packet hashing device comprises means for computing a cryptographically secure hash value from said non-mutable field values.

24. The apparatus of claim 18, wherein said packet hashing device comprises means for computing a LFSR checksum value using an internal state indicator and said non-mutable field values.

25. The apparatus of claim 18, wherein said packet hashing device comprises means for computing a hash value using a secret number.

26. A computer-readable medium storing a computer program executable by a plurality of server computers, the computer program comprising computer instructions for:

receiving original packets and corresponding retransmit packets from a network, wherein:
  each said original packet and corresponding retransmit packet belong to a flow; and
  each said original packet and corresponding retransmit packet has a plurality of non-mutable field values;
hashing said non-mutable field values of each said original packet to produce a validation signature of each said original packet;
storing said validation signatures;
hashing said non-mutable field values of each said corresponding retransmit packet to produce a test signature of each said corresponding retransmit packet;
comparing said validation signature to said test signature; and
if said test signature and said validation signature are not identical, terminating said flow.

27. The computer-readable medium of claim 26, wherein said computer instructions for storing further comprise computer instructions for retaining said validation signatures for a limited time.

28. The computer-readable medium of claim 26, wherein said computer instructions for hashing further comprise computer instructions for computing a checksum from said non-mutable field values.

29. The computer-readable medium of claim 26, wherein said computer instructions for hashing further comprise computer instructions for computing a hash value from said non-mutable field values.

30. The computer-readable medium of claim 26, wherein said computer instructions for hashing further comprise computer instructions for computing a strong hash value from said non-mutable field values.

31. The computer-readable medium of claim 26, wherein said computer instructions for hashing further comprise computer instructions for computing a cryptographically secure hash value from said non-mutable field values.

32. The computer-readable medium of claim 26, wherein said computer instructions for hashing further comprise computer instructions for computing a LFSR checksum value using an internal state indicator and said non-mutable field values.

33. The computer-readable medium of claim 26, wherein said computer instructions for hashing further comprise computer instructions for computing a hash value using a secret number.

34. The method of claim 1 wherein:

receiving original packets and corresponding retransmit packets from a network includes receiving original packets and corresponding retransmit packets from a first network host on an unprotected network across a first network connection; and the method further comprises:
  if said test signature and said validation signature are identical, forwarding said corresponding retransmit packet to a second network host on a protected network across a second network connection, the first and second network hosts being distinct.

35. The apparatus of claim 18 wherein the apparatus further comprises:

a first network interface for receiving said original packets and corresponding retransmit packets from a first network host on an unprotected network; and a second interface for:
  transmitting said original packets to a second network host on a protected network, the first and second network hosts being distinct; and
  transmitting said corresponding retransmit packets to the second network host if said output indicates that said test signature and said validation signature are identical.

* * * * *